US010656171B1

(12) United States Patent
Pleiman et al.

(10) Patent No.: US 10,656,171 B1
(45) Date of Patent: May 19, 2020

(54) TIME-DEPENDENT PRESSURE AND DIRECTIONAL SENSING PROBE

(71) Applicant: Government of the United States, as represented by the Secretary of the Air Force, Wright-Patterson AFB, OH (US)

(72) Inventors: Brock J. Pleiman, Mason, OH (US); Angela R. Scribben, Springfield, OH (US); Frank C. Semmelmayer, Dayton, OH (US); Kevin L. King, Springfield, OH (US)

(73) Assignee: Government of the United States as Represented by the Secretary of the Air Force, Wright-Patterson AFB, OH (US)

( * ) Notice: Subject to any disclaimer, the term of this patent is extended or adjusted under 35 U.S.C. 154(b) by 1 day.

(21) Appl. No.: 16/209,335

(22) Filed: Dec. 4, 2018

Related U.S. Application Data

(60) Provisional application No. 62/640,369, filed on Mar. 8, 2018.

(51) Int. Cl.
*G01F 1/46* (2006.01)
*G01F 1/34* (2006.01)
*G01F 1/20* (2006.01)
*G01P 5/16* (2006.01)
*G01P 13/02* (2006.01)

(52) U.S. Cl.
CPC ............. *G01P 5/16* (2013.01); *G01F 1/206* (2013.01); *G01F 1/34* (2013.01); *G01P 13/025* (2013.01)

(58) Field of Classification Search
CPC ... G01P 5/16; G01L 9/00; G01F 1/206; G01F 1/34; G01F 1/46
See application file for complete search history.

(56) References Cited

U.S. PATENT DOCUMENTS

| | | | | |
|---|---|---|---|---|
| 3,029,639 | A * | 4/1962 | Groesbeck | G01P 5/165 73/861.65 |
| 3,318,146 | A * | 5/1967 | Hagen | G01L 15/00 73/180 |
| 3,585,859 | A * | 6/1971 | De Leo | B64D 43/02 73/700 |
| 3,914,997 | A * | 10/1975 | Pinckney | G01F 1/46 73/182 |
| 4,096,744 | A * | 6/1978 | De Leo | G01C 5/06 73/180 |

(Continued)

OTHER PUBLICATIONS

"Flow Angle Probe Miniature Pressure Transducer," and "Flow Angle Probe High Temperature Miniature Pressure Transducer," Kulite publications, 2014.
Alexander A. Ned et al., "Fully Integrated Miniature, High Frequency Flow Probe Utilizing Leadless, SOI Technology Suitable for Gas Turbines," Kulite publication, 2010.

(Continued)

*Primary Examiner* — Jewel V Dowtin
(74) *Attorney, Agent, or Firm* — AFMCLO/JAZ

(57) ABSTRACT

An air speed probe with a cylindrical probe body having a length, and a frusto-conical tip at an end of the cylindrical probe body. A center bore with a first diameter and first depth is formed in a center of the tip and coaxially disposed along a portion of the length of the cylindrical probe body. Radial bores with second diameters and second depths are formed in a sidewall of the tip, where the first diameter is wider than the second diameter, and the first depth is shallower than the second depth.

20 Claims, 1 Drawing Sheet

(56) References Cited

U.S. PATENT DOCUMENTS

| | | | | |
|---|---|---|---|---|
| 4,378,696 | A * | 4/1983 | DeLeo | G01C 5/06 |
| | | | | 73/180 |
| 4,836,019 | A * | 6/1989 | Hagen | G01P 5/165 |
| | | | | 73/180 |
| 5,233,865 | A | 8/1993 | Rossow | |
| 5,319,970 | A * | 6/1994 | Peterson | G01P 5/165 |
| | | | | 73/180 |
| 5,423,209 | A | 6/1995 | Nakaya et al. | |
| 6,892,584 | B2 * | 5/2005 | Gilkison | G01P 5/165 |
| | | | | 73/1.29 |
| 7,392,710 | B1 | 7/2008 | Ben-Mansour et al. | |
| 9,474,837 | B2 * | 10/2016 | Schmidt | A61M 1/0025 |
| 9,574,960 | B2 | 2/2017 | Ned et al. | |
| 2012/0048023 | A1 | 3/2012 | Kurtz | |
| 2014/0331750 | A1 | 11/2014 | Vander Hoek | |
| 2016/0011065 | A1 | 1/2016 | Ned et al. | |

OTHER PUBLICATIONS

Jose C. Gonsalez et al., "Five-Hole Flow Angle Probe Calibration for the NASA Glenn Icing Research Tunnel," 19th Advanced Measurement and Ground Testing Technology Conference, New Orleans, Louisiana, Jun. 17-20, 1996.

"Wind Tunnel and Flight Test Pressure Transducers," Kulite product brochure. Date unknown.

John D. Norris, "Calibration of conical pressure probes for determination of local flow conditions at mach Nos. from 3 to 6," NASA Technical Note D-3076, Nov. 1965.

A. Robert Porro, "Pressure Probe Designs for Dynamic Pressure Measurements in a Supersonic Flow Field," NASA Technical Memorandum 2001-211096, Jul. 2001.

Gregory G. Zilliac, "Calibration of Seven-Hole Pressure Probes for Use in Fluid Flows with Large Angularity," NASA Technical Memorandum 102200, Dec. 1989.

* cited by examiner

AFD 1764, Time-Dependent Pressure and Directional Sensing Probe, Pleiman et al.

TIME-DEPENDENT PRESSURE AND DIRECTIONAL SENSING PROBE

RELATED APPLICATIONS

This application claims all rights and priority on prior U.S. provisional patent applications Ser. No. 62/640,369 filed 2018 Mar. 8, the entirety of the disclosure of which is incorporated herein by reference.

GOVERNMENT RIGHTS STATEMENT

The invention described herein may be manufactured and used by or for the Government of the United States for all governmental purposes without the payment of any royalty.

FIELD OF THE INVENTION

This invention relates to the field of sensors. More particularly, this invention relates to air speed sensors.

BACKGROUND OF THE INVENTION

Pressure sensors can be used to measure air speed, such as the air speed within a wind tunnel or the air speed of an aircraft. In some embodiments, several pressure sensors are fitted into recesses that are formed in the conical tip of a pressure probe. Typically, one sensor is facing axially forward at the apex of the conical tip, and several others (4-7 or so) are facing angularly outward on the conical sidewall of the tip. In this manner, directional components of the air speed can be measured.

Some pressure sensors are so-called time-variant or time-dependent sensors, which have a relatively faster response rate to fluctuations in pressure. Other pressure sensors are so-called steady-state or time-averaged sensors, which have a relatively slower response rate to fluctuations in pressure. Time-variant sensors must be located close to the measurement plane, and thus require a relatively larger volume and area near the measurement plane than steady-state sensors, which can be located some distance away from the measurement plane. Because air pressure can vary greatly from one position to the next, it is desirable for probes to be as small as possible, so that more measurements positions can exist within a given space, and so that the size of the probes themselves does not appreciable factor into the measurements.

Because two components of air speed (total pressure and flow angularity) tend to be of interest, two different probe types are typically used to take the two different measurements. For example, in the case of a wind tunnel, a first rake of probes with time-variant total pressure sensors might be set up for a set of experiments, and then a second rake of probes with steady-state flow angularity sensors might be set up for repeated runs of the experiments. On an airframe, two separate sets of probes might be set up to take measurements. The need to duplicate either experimental conditions or equipment is costly.

What is needed, therefore, is an air speed probe that tends to reduce issues such as those described above, at least in part.

SUMMARY OF THE INVENTION

The above and other needs are met by an air speed probe with a cylindrical probe body having a length, and a frusto-conical tip at an end of the cylindrical probe body. A center bore with a first diameter and first depth is formed in a center of the tip and coaxially disposed along a portion of the length of the cylindrical probe body. Radial bores with second diameters and second depths are formed in a sidewall of the tip, where the first diameter is wider than the second diameter, and the first depth is shallower than the second depth.

In some embodiments according to this aspect of the invention, a time-variant pressure sensor is disposed at a bottom of the center bore. In some embodiments steady-state pressure sensors are disposed at a bottom of each of the radial bores. In some embodiments four radial bores are formed in the probe. In some embodiments an angle of the sidewall of the tip is between about 25 degrees and about 60 degrees. In some embodiments the probe is formed of metal. In some embodiments a ratio of the first diameter to the second diameter is about 3:1. In some embodiments the radial bores are disposed axially parallel along the length of the cylindrical probe body.

According to another aspect of the invention there is described an air speed probe with a cylindrical probe body having a length, and a frusto-conical tip at an end of the cylindrical probe body. A center bore is formed in a center of the tip, with a time-variant pressure sensor disposed within the center bore. Radial bores are formed in a sidewall of the tip, and a steady-state pressure sensor is disposed within each of the radial bores.

In some embodiments according to this aspect of the invention, the center bore has a first diameter and first depth, and the radial bores have second diameters and second depths, where the first diameter is wider than the second diameter, and the first depth is shallower than the second depth. In some embodiments a ratio of the first diameter to the second diameter is about 3:1. In some embodiments four radial bores are formed in the probe. In some embodiments an angle of the sidewall of the tip is between about 25 degrees and about 60 degrees. In some embodiments the probe is formed of metal. In some embodiments the radial bores are disposed axially parallel along the length of the cylindrical probe body.

According to yet another aspect of the invention there is described an air speed probe with a cylindrical probe body having a length. A frusto-conical tip is disposed at an end of the cylindrical probe body, with a center bore having a first diameter and first depth formed in a center of the tip and coaxially disposed along a portion of the length of the cylindrical probe body. Radial bores with second diameters and second depths are formed in a sidewall of the tip, where a ratio of the first diameter to the second diameter is about 3:1.

In some embodiments according to this aspect of the invention, a time-variant pressure sensor is disposed at a bottom of the center bore. In some embodiments steady-state pressure sensors are disposed at a bottom of each of the radial bores. In some embodiments an angle of the sidewall of the tip is between about 25 degrees and about 60 degrees. In some embodiments the first depth is shallower than the second depth.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION OF THE INVENTION

Figure 1:
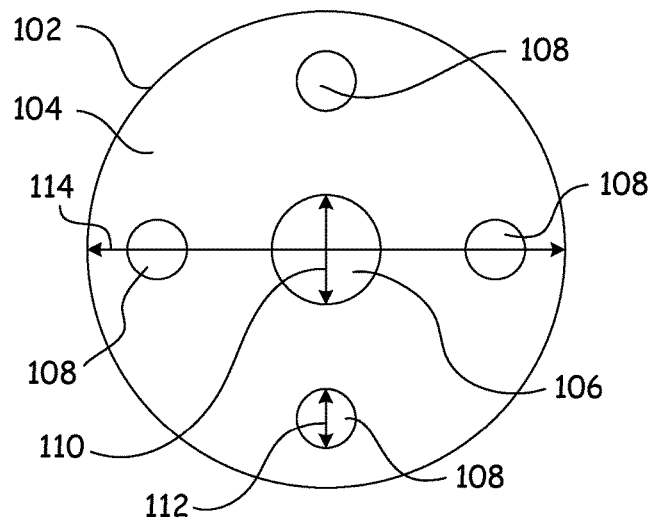
FIG. 1 is an end view of an air speed probe according to an embodiment of the present invention.
Figure 2:
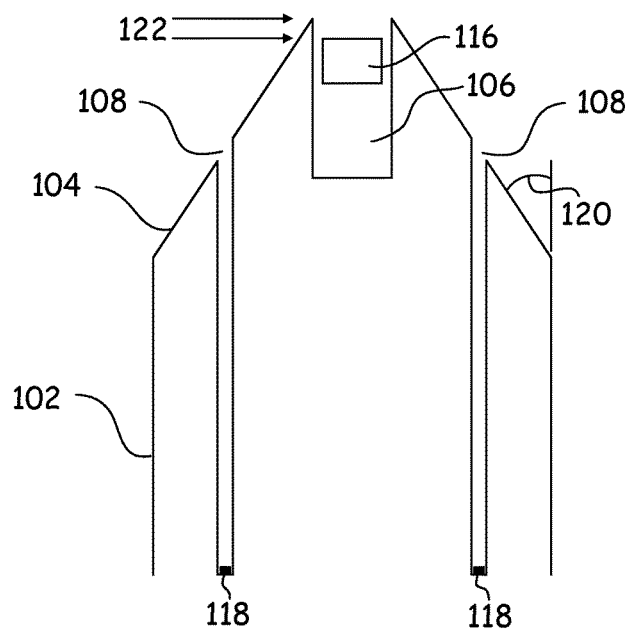
FIG. 2 is a cross-sectional view of an air speed probe according to an embodiment of the present invention.

With reference now to the figures, there is depicted an end portion of an air speed probe 100 according to an embodiment of the present invention. The probe 100 has a generally cylindrical body 102, at the end of which is a frusto-conical tip 104. A center bore 106 is formed at the apex of the tip 104, which is what truncates the tip 104 of the cone. A plurality of radial bores 108 are formed in the sidewall of the tip 104. Disposed within the center bore 106 is a time-variant pressure sensor 116. Disposed within the radial bores 108 are steady-state pressure sensors 118. In some embodiments, tubes are connected to the ends of the radial bores 108, and the steady-state pressure sensors 118 are disposed at the distal ends of the tubes.

In some embodiments the bores 106 and 108 are formed in a solid piece of material that forms the probe 100. In other embodiments, one or more of the bores 106 and 108 are formed as tubes within a hollow piece of material that forms the probe 100. In some embodiments the center bore 106 is formed as a substantially blind bore, with openings for the electrical wires from the time-variant sensor 116 to pass. In some embodiments the radial bores 108 are joined to long tubes that extend out of the distal end of the probe 100 to a location that is relatively remote from the probe 100, where the steady-state sensors 118 are located.

The radial bores 108 can be formed with much smaller diameters than the center bore 106, because the steady-state sensors 118 do not need to measure rapid fluctuations in air pressure, and thus such perturbations do not need to be conducted down the radial bores 108.

In one embodiment there are four radial bores 108, as depicted. In other embodiments there is a different number of radial bores 108 formed, such as seven. In some embodiments the centers of the radial bores 108 are formed in the sidewall of the tip 104 at a position that is midway between the outer edge of the center bore 106 and the outer surface of the probe body 102. In one embodiment the diameter 110 of the center bore is between about 60 mils and about 70 mils. In one embodiment the diameter 112 of the radial bores is between about 20 mils and about 30 mils.

In one embodiment the time-variant sensor 116 has a diameter of between about 55 mils and about 66 mils, and the diameter of the center bore 106 is between about 2 mils and about 5 mils larger than the diameter of the time-variant sensor 116.

In one embodiment the steady-state sensor 118 has a diameter of between about 17 mils and about 28 mils, and the diameter of the radial bores 108 are between about 1 mil and 3 mils larger than the diameters of the steady-state sensors 118.

In one embodiment the time-variant sensor 116 is one of a model XCQ-055 or XCQ-062 manufactured by Kulite Semiconductor Products, Inc. of Leonia N.J.

The difference between a time-variant sensor 116 and a steady-state sensor 118 as used herein refers to one or more differences in either the sensor itself or the manner in which it is deployed. In one aspect, a time-variant sensor is one that operates above about 10 hertz, and a steady-state sensor is one that operates below about 10 hertz. In another aspect, a time-variant sensor is one that is disposed in or near a relatively open environment at the top of a bore and can sense rapid fluctuations of ambient pressure, while a steady-state sensor is disposed deeper within a bore, where rapid fluctuations of pressure are not propagated to the depth within the bore at which the steady-state sensor resides. In a third aspect, time-variant sensors have a bigger diameter and length because they have an attached electronics package that is required for management of the sensor, while steady-state sensors have electronics that can be disposed at a location that is distant from the sensor.

In one embodiment the time-variant sensor 116 is disposed at a distance 122 of between about 0 mm and about 5 mm below the topmost point of the tip 104. In another embodiment, the time-variant sensor 116 is disposed above the truncated tip 104. In one embodiment the angle 120 of the tip 104 to sidewall 102 is between about 25 degrees and about 60 degrees. In one embodiment the ratio of the diameter 110 of the center bore 106 to the diameter 112 of the radial bores 108 is about 3:1.

In one embodiment the probe 100 is formed of a metal, such as brass. In another embodiment, the probe 100 is formed of a durable thermoplastic resin. In some embodiments the diameter 114 of the probe 100 is between about 165 mils and about 180 mils.

By using just one time-variant sensor 116 in the center of the probe 100, and smaller steady-state sensors 118 in the radial positions, the overall size of the probe 100 can be made smaller, while keeping all of the benefits of taking measurements with both time-variant sensors 116 and steady-state sensors 118.

The probe 100 merges the various pressure sensing technologies into a single package capable of measuring individually all of the properties of the flow as though two separate probe types had been used. In some embodiments the radial bores 108 are tubed to a steady state transducer 118. The results from baseline testing prove that this probe 100 is capable of measuring turbulent fluctuations that can accurately detect the angle of the flow, static pressure, and Mach, the steady-state flow direction, total pressure, static pressure, and speed similar to a historical steady state probe, while also showing that the time-dependent sensor offers an additional calibration to measure the turbulent air flow. Because this probe 100 can replace two other probes, the space saved and size of the probe 100 in comparison to the cumulative size of the two or three historical probes is greatly reduced.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

REFERENCE NUMBER INDEX

100 Air speed probe
102 Cylindrical probe body
104 Frusto-conical tip

106 Center bore
108 Radial bore
110 Center bore diameter
112 Radial bore diameter
114 Probe body diameter
116 Time-variant pressure sensor
118 Steady-state pressure sensor
120 Conical tip angle
122 Time-variant sensor depth

What is claimed is:

1. An air speed probe, comprising:
a cylindrical probe body having a length,
a frusto-conical tip at an end of the cylindrical probe body,
a center bore having a first diameter and first depth formed in a center of the tip and coaxially disposed along a portion of the length of the cylindrical probe body, and
radial bores having second diameters and second depths formed in a sidewall of the tip,
where the first diameter is wider than the second diameter, and the first depth is shallower than the second depth.

2. The probe of claim 1, further comprising a time-variant pressure sensor disposed at a bottom of the center bore.

3. The probe of claim 1, further comprising steady-state pressure sensors disposed at a bottom of each of the radial bores.

4. The probe of claim 1, wherein four radial bores are formed in the probe.

5. The probe of claim 1, wherein an angle of the sidewall of the tip is between about 25 degrees and about 60 degrees.

6. The probe of claim 1, wherein the probe is formed of metal.

7. The probe of claim 1, wherein a ratio of the first diameter to the second diameter is about 3:1.

8. The probe of claim 1, wherein the radial bores are disposed axially parallel along the length of the cylindrical probe body.

9. An air speed probe, comprising:
a cylindrical probe body having a length,
a frusto-conical tip at an end of the cylindrical probe body,
a center bore formed in a center of the tip,
a time-variant pressure sensor disposed within the center bore,
radial bores formed in a sidewall of the tip, and
a steady-state pressure sensor connected to each of the radial bores.

10. The probe of claim 9, wherein the center bore has a first diameter and first depth, and the radial bores have second diameters and second depths, where the first diameter is wider than the second diameter, and the first depth is shallower than the second depth.

11. The probe of claim 10, wherein a ratio of the first diameter to the second diameter is about 3:1.

12. The probe of claim 9, wherein four radial bores are formed in the probe.

13. The probe of claim 9, wherein an angle of the sidewall of the tip is between about 25 degrees and about 60 degrees.

14. The probe of claim 9, wherein the probe is formed of metal.

15. The probe of claim 9, wherein the radial bores are disposed axially parallel along the length of the cylindrical probe body.

16. An air speed probe, comprising:
a cylindrical probe body having a length,
a frusto-conical tip at an end of the cylindrical probe body,
a center bore having a first diameter and first depth formed in a center of the tip and coaxially disposed along a portion of the length of the cylindrical probe body, and
radial bores having second diameters and second depths formed in a sidewall of the tip,
where a ratio of the first diameter to the second diameter is about 3:1.

17. The probe of claim 16, further comprising a time-variant pressure sensor disposed at a bottom of the center bore.

18. The probe of claim 16, further comprising steady-state pressure sensors disposed at a bottom of each of the radial bores.

19. The probe of claim 16, wherein an angle of the sidewall of the tip is between about 25 degrees and about 60 degrees.

20. The probe of claim 16, wherein the first depth is shallower than the second depth.

* * * * *